UNITED STATES PATENT OFFICE.

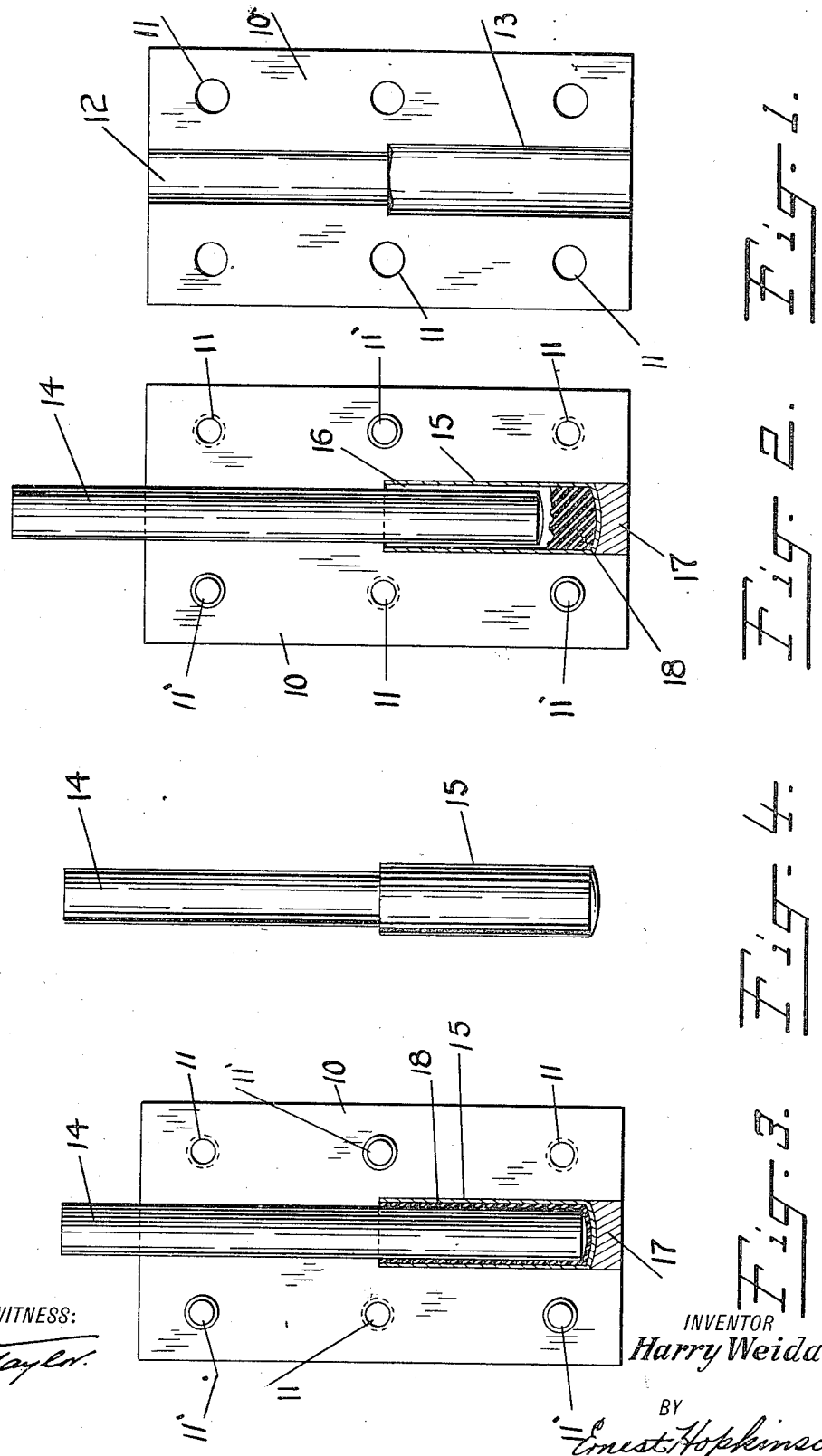

HARRY WEIDA, OF HIGHLAND PARK, NEW JERSEY, ASSIGNOR TO THE INDIA RUBBER COMPANY, A CORPORATION OF NEW JERSEY.

PROCESS OF MAKING HARD-RUBBER ARTICLES.

1,195,118.

Specification of Letters Patent.   Patented Aug. 15, 1916.

Application filed August 10, 1915.   Serial No. 44,681.

*To all whom it may concern:*

Be it known that I, HARRY WEIDA, a citizen of the United States, residing at Highland Park, in the county of Middlesex, State of New Jersey, have invented certain new and useful Improvements in Processes of Making Hard-Rubber Articles, of which the following is a full, clear, and exact description.

This invention relates to hard rubber articles and has for an object to provide an improved process for manufacturing the same whereby the use of a mold during vulcanization will be dispensed with.

In the manufacture of hard rubber articles it is customary to confine the same within rigid metal sections of a mold during vulcanization. By my improved process the mold is used in connection with a plunger-like core in connection with a metallic foil envelop or casing to impart the desired shape to the article only, the article being unconfined as to its exterior except by the metallic foil during vulcanization. Thus the mold will be used only to shape the article prior to vulcanization and may be used over a great number of times in this capacity during the period which it has hitherto remained in the vulcanizer, and therefore the cost of production of articles by this method is materially reduced.

The invention can be readily understood from the following description taken in connection with the accompanying drawing, in which—

Figure 1 is a view in elevation of a section of a rubber mold; Fig. 2 is a view in elevation showing the material being shaped into the desired form; Fig. 3 is a view in elevation showing the material shaped into the desired form; Fig. 4 is a view in elevation of the plunger-like core with the article supported on the outside by tinfoil ready for vulcanization.

Referring now to the drawing in which like characters of reference designate similar parts, 10 designates a rigid section of a metal mold, the complete mold comprising two counterpart sections similar to the one shown. The sections are connected together by suitable connectors 11' passed through openings 11 in both sections. Each section is formed with a longitudinal groove 12 which communicates with an enlarged groove 13. The grooves 12 in both sections of the mold coact to receive a cylindrical plunger-like core 14 and the grooves 13 coact in forming a cylindrical chamber of greater diameter than the core and of sufficient diameter to receive a tinfoil envelop or casing 15 and leave a space 16 between the casing and the plunger-like core as best shown in Fig. 2. The casing is of less length than the chamber and the end of the chamber is closed by a removable plug 17 against which the end of the casing bears, the casing consequently being confined by rigid metal walls on all sides. The top of the casing is open to permit entrance of the plunger-like core and to permit insertion of a sufficient amount of material 18 from which the article is to be formed.

The material 18 is preferably of rubber compound of such character as to take a hard consistency during vulcanization, in the present embodiment of the invention, the material illustrated being that used for the manufacture of fountain pen caps.

The material is inserted prior to the insertion of the plunger-like core and gravitates to the bottom of the tin foil casing 15 where it accumulates as shown. The plunger-like core is then inserted and forced forwardly upon the material, the pressure of the core causing the material to move backwardly into the space 16 between the core and casing until the same is completely filled as shown in Fig. 3. The mold sections are now opened and the plunger-like core with the formed article and tinfoil casing adhering thereto is now removed and placed in the vulcanizer where it is subjected to a sufficient temperature for a sufficient period of time to effect the desired degree of vulcanization in the article. The tinfoil casing serves to hold the shaped article in place during the early stages of vulcanization when because of the heat the stock becomes mobile and non-self-supporting. The casing is of sufficient rigidity to maintain its shape and hold the article in shape until the vulcanization has progressed sufficiently to carry the material past its plastic stage, that is, until the heat has acted sufficiently on the material to impart self-sustaining consistency to the material. After completion of the vulcanizing step, the tinfoil casing may be stripped from the article, whereupon the article is slipped off from the end of the plunger. The article thus produced will be found to exhibit a smooth exterior imparted by the smooth surface of the tinfoil.

In the above description, only tinfoil has been mentioned as a material for forming the casing 15, and for the production of fountain pen caps, the manufacture of which I have described as a typical example of my method, it is this material which I utilize. However, in manufacturing the many articles for the production of which this method is adapted, I may form the casings of any metallic foil having the necessary physical characteristics, and I wish to be understood as desiring to protect their use.

What is claimed is:

1. The process of making rubber articles consisting of shaping the material upon a core within a metallic foil envelop having the configuration of the article to be formed, and subsequently vulcanizing the article supported upon the interior by said core and upon the exterior by said envelop.

2. The process of making rubber articles consisting of forcing the material into the space between a plunger-like core and a metallic foil casing rigidly confined from the outside, and subsequently vulcanizing the material while supported upon said core, and confined upon the outside by said casing.

Signed at New Brunswick, N. J., this 4th day of August 1915.

HARRY WEIDA.